United States Patent
Sharma et al.

(10) Patent No.: US 11,772,894 B2
(45) Date of Patent: Oct. 3, 2023

(54) INTERNET OF THINGS-BASED SMART STORAGE UNITS

(71) Applicant: International Business Machines Corporation, Armonk, NY (US)

(72) Inventors: Radhika Sharma, Bangalore (IN); Mukundan Sundararajan, Bangalore (IN); Shilpa Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 17/085,575

(22) Filed: Oct. 30, 2020

(65) Prior Publication Data

US 2022/0135325 A1 May 5, 2022

(51) Int. Cl.
*G06F 7/00* (2006.01)
*B65G 1/06* (2006.01)
(Continued)

(52) U.S. Cl.
CPC ............... *B65G 1/065* (2013.01); *B25J 5/00* (2013.01); *B25J 9/161* (2013.01); *B66F 9/063* (2013.01);
(Continued)

(58) Field of Classification Search
CPC . B25J 5/00; B25J 9/161; B25J 11/008; B65G 1/065; B66F 9/063; G06Q 10/087;
(Continued)

(56) References Cited

U.S. PATENT DOCUMENTS

| 7,080,916 | B1 * | 7/2006 | Ferrin | A47G 21/182 |
| | | | | 220/705 |
| 11,446,810 | B1 * | 9/2022 | Chua | B25J 19/023 |

(Continued)

FOREIGN PATENT DOCUMENTS

IN 201741020141 A 12/2018

OTHER PUBLICATIONS

"Midwest grocery chain debuts a robot named Tally," Retail Customer Experience, Aug. 1, 2017, 1 page. <https://www.retailcustomerexperience.com/news/midwest-grocery-chain-debuts-a-robot-named-tally/>.

(Continued)

*Primary Examiner* — Yolanda R Cumbess
(74) *Attorney, Agent, or Firm* — Richard B. Thomas

(57) ABSTRACT

Embodiments relate to a system, computer program product, and method for smart storage units using Internet of things (IoT) technology, and, more specifically, for substantially end-to-end autonomous management of consumable commodities. The system includes a robot including one or more external lighting devices and a storage unit comprising a cap and a container portion, the cap is coupled to the container portion and is communicatively coupled to the robot. The cap includes one or more external energy collection devices configured to receive light energy from the one or more external lighting devices. The cap also includes a first processing device electrically coupled to the one or more external energy collection devices. The first processing device is configured to collect data associated with an inventory of the contents of the container portion and transmit the inventory data to the robot.

20 Claims, 11 Drawing Sheets

(51) Int. Cl.
*G06Q 10/087* (2023.01)
*G06Q 30/0601* (2023.01)
*B25J 9/16* (2006.01)
*B66F 9/06* (2006.01)
*H04N 7/18* (2006.01)
*B25J 5/00* (2006.01)
*G16Y 10/75* (2020.01)

(52) U.S. Cl.
CPC ....... *G06Q 10/087* (2013.01); *G06Q 30/0633* (2013.01); *H04N 7/183* (2013.01); *G16Y 10/75* (2020.01)

(58) Field of Classification Search
CPC .... G06Q 30/0633; G16Y 10/75; H04N 7/181; H04N 7/183
USPC ................................ 700/213–214, 218, 228
See application file for complete search history.

(56) References Cited

U.S. PATENT DOCUMENTS

2013/0223673 A1* 8/2013 Davis ...................... G06F 3/147
235/375

2016/0247118 A1 8/2016 Singh
2017/0270474 A1 9/2017 McCoy

OTHER PUBLICATIONS

"Neo—Smart Jar," Indiegogo, Inc., accessed Mar. 9, 2020, 3 pages. <https://www.indiegogo.com/projects/neo-smart-jar#/>.
Mell et al., "The NIST Definition of Cloud Computing," Recommendations of the National Institute of Standards and Technology, U.S. Department of Commerce, Special Publication 800-145, Sep. 2011, 7 pages.
Miller, "The robot invasion has begun in the grocery aisle," New York Post, Jul. 27, 2017, 2 pages. <https://nypost.com/2017/07/27/the-robot-invasion-has-begun-in-the-grocery-aisle/>.
Purkayastha, "Kitchen Inventory Management with Smart Jar," Radiostudio Tech. Pvt. Ltd., accessed Mar. 9, 2020, 8 pages. <https://radiostud.io/kitchen-inventory-management-smart-jar/>.
Sakthisudhan et al. "A Smart Kitchen Automation and Grocery Management System using IoT," International Journal of Recent Technology and Engineering (IJRTE), vol. 8, Issue 1, ISSN: 2277-3878, May 2019, pp. 2368-2373. <https://www.ijrte.org/wp-content/uploads/papers/v8i1/A1447058119.pdf>.

* cited by examiner

US 11,772,894 B2

INTERNET OF THINGS-BASED SMART STORAGE UNITS

BACKGROUND

The present disclosure relates to smart storage units using Internet of things (IoT) technology, and, more specifically, for substantially end-to-end autonomous management of consumable commodities.

Many areas of peoples' daily lives include using a plurality of fungible items and materials, i.e., commodities that are normally stored within individual storage units. These commodities are used with some periodicity that may be irregular. For example, for a home kitchen where one or more family members bake at least occasionally, sugar is used occasionally. Irregular usage is typically accompanied with irregular observations of the quantity of sugar remaining.

SUMMARY

A system, computer program product, and method are provided for using smart storage units and Internet of things (IoT) technology, and, more specifically, for substantially end-to-end autonomous management of consumable commodities.

In one aspect, a computer system is provided to use smart storage units and Internet of things (IoT) technology, and, more specifically, for substantially end-to-end autonomous management of consumable commodities. The computer system includes a robot including one or more external lighting devices and a storage unit comprising a cap and a container portion. The cap is coupled to the container portion and the cap is communicatively coupled to the robot. The cap includes one or more external energy collection devices configured to receive light energy from the one or more external lighting devices. The cap also includes a first processing device electrically coupled to the one or more external energy collection devices. The first processing device is configured to collect data associated with an inventory of the contents of the container portion and transmit the inventory data to the robot.

In another aspect, a computer program product is provided for using smart storage units and Internet of things (IoT) technology, and, more specifically, for substantially end-to-end autonomous management of consumable commodities. The computer program product includes one or more computer readable storage media and program instructions collectively stored on the one or more computer-readable storage media. The program instructions include program instructions to boot up the first processing device in response to a first processing device being energized with at least a portion of light energy captured by one or more external energy collection devices coupled to a cap for a storage unit, the one or more external energy collection devices being illuminated with light energy radiating from one or more external lighting devices coupled to a robot. The program instructions further include program instructions to capture inventory data of contents within a container portion of the storage unit. The program instructions further include program instructions to transmit, with at least a portion of the light energy, the captured inventory data to the robot.

In yet another aspect, a computer-implemented method for using smart storage units and Internet of things (IoT) technology, and, more specifically, for substantially end-to-end autonomous management of consumable commodities. The method includes capturing, by one or more external energy collection devices coupled to a cap for a storage unit, at least a portion of light energy radiating from one or more external lighting devices coupled to a robot, the one or more external energy collection devices being illuminated by the light energy. The method further includes energizing, with at least a portion of the light energy, a first processing device within the cap with at least a portion of the light energy. The method also includes booting up the first processing device. The method further includes capturing inventory data of contents within a container portion of the storage unit. The method also includes transmitting, with at least a portion of the light energy, the captured inventory data to the robot.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
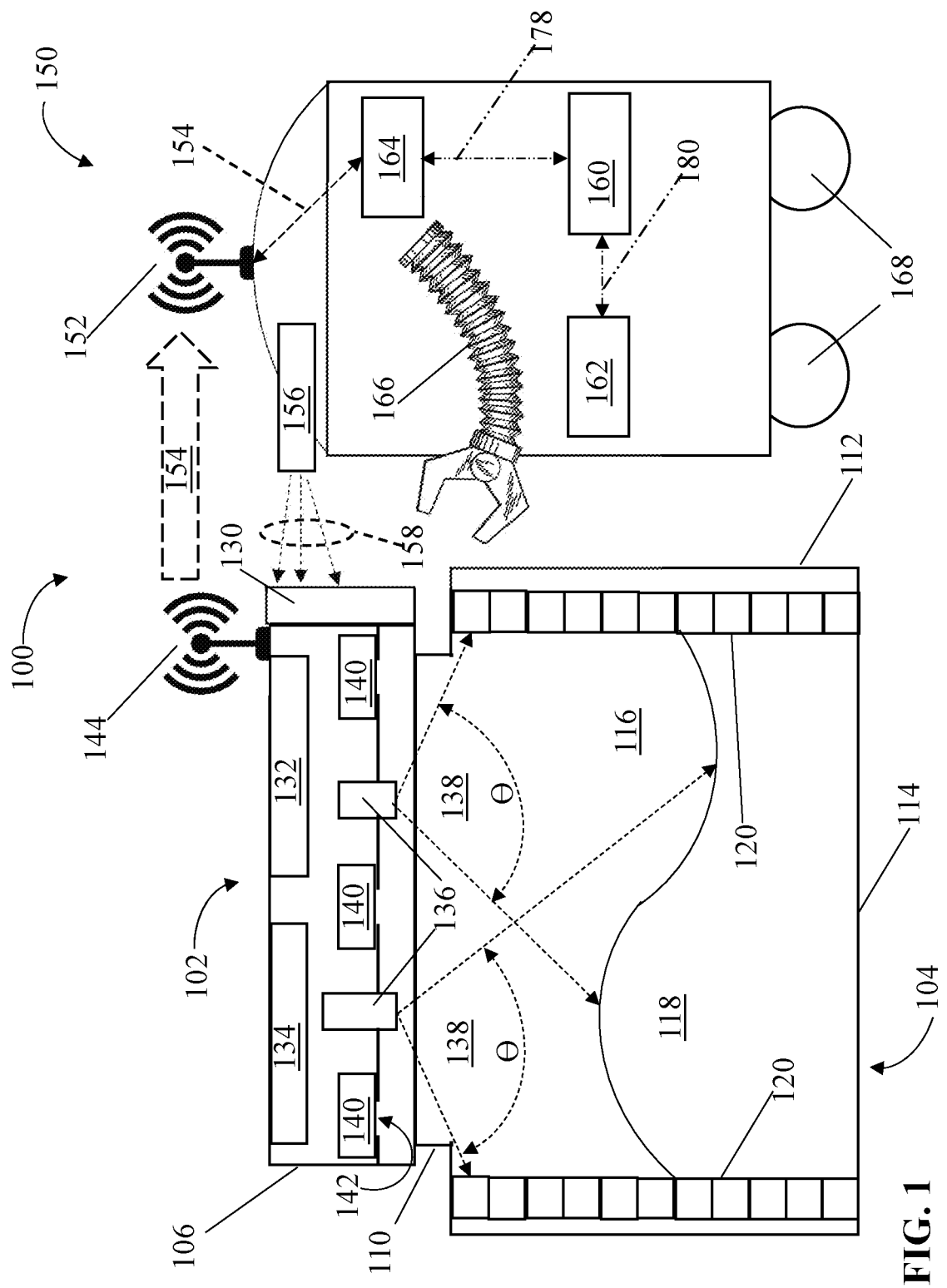
FIG. 1 is a schematic diagram illustrating a portion of a computer system suitable for using smart storage units and Internet of things (IoT) technology, and, more specifically, for substantially end-to-end autonomous management of consumable commodities, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many areas of peoples' daily lives include using a plurality of fungible items and materials, i.e., consumable commodities that are normally stored within individual storage units. These consumable commodities are used with some periodicity that may be irregular. For example, for a home kitchen where one or more family members bake, sugar is used occasionally. Irregular usage is typically accompanied with irregular observations of the quantity of sugar remaining. Therefore, the inventory is either actively managed to maintain some minimum inventory of sugar, or otherwise, some family member wanting sugar for any reason may be disappointed if the inventory of sugar has been depleted. Similarly, non-culinary consumable commodities for other residential purposes, such as cleaning materials and lubricants, may also be used irregularly and are susceptible to inadvertent exhaustion. Moreover, non-residential entities, such as, and without limitation, retailers of the residential commodities, office environments, service organizations, and maintenance facilities may also be reliant upon mechanisms for maintaining a satisfactory inventory of the many consumable commodities required for their businesses that occasionally may be neglected.

A system, computer program product, and method are disclosed and described herein for smart storage units using Internet of things (IoT) technology, and, more specifically, for substantially end-to-end autonomous management of consumable commodities. The system includes a storage unit that is used to contain a consumable and fungible commodity. In at least one embodiment, a plurality of storage units as described herein are positioned proximate each other, each storage unit with a different commodity therein. In one or more embodiments, more than one of the storage units contains a similar, or identical, commodity. In one or more embodiments, the plurality of storage units are positioned in a plurality of areas. Each of the storage units include a container portion that may have any geometrical configuration that enables the embodiments disclosed herein, including, without limitation, at least one or more of partially cylindrical and partially rectangular features. Each of the container portions includes a wall to contain the commodity, one or more level scales with predetermined level units inscribed thereon adjacent the wall to indicate a level of the commodity within the container portion, and a neck to receive a smart cap. In at least one embodiment, the wall is opaque to visible light. The wall defines an interior storage cavity that is configured to store the commodity. The storage units are sold by retailers for many grocery items.

The smart cap is a portion of the storage unit that is configured to be mechanically and removably coupled to the container portion at the neck of the container portion. In at least some embodiments, each smart cap includes a storage unit antenna for communication with external devices such as a robot (described further herein). The smart cap also includes a processing device with an embedded light-weight operating system for execution of all of the functions of the smart cap, as described further herein. The smart cap includes a plurality of cameras and a plurality of interior lamps. In addition, the smart cap includes one or more high energy capacitive devices coupled to a photovoltaic (PV) cell. The storage unit antenna is communicatively coupled to the processing device. The high energy capacitive devices are electrically coupled to the plurality of cameras, the plurality of interior lamps, the storage unit antenna, and the processing device. The processing device is communicatively coupled to the plurality of cameras and the plurality of interior lamps.

The system also includes a robot that includes a motive transport device, that is in at least one embodiment, a plurality of steerable wheels. The robot also includes one or more object handling devices that are in at least one embodiment, one or more arms. The robot also includes a robot antenna that may be communicatively coupled with the storage unit antenna. The robot further includes a robot lamp that is configured to illuminate the PV cell on the smart cap. The robot also includes an internal computer system that includes a memory device, a processing device, and a communications device, all communicatively coupled to each other.

A local/cloud network is configured to be communicatively coupled to the robot. The local/cloud network includes at least one network antenna. In addition, the local/cloud network includes a computer system that includes a processing device, memory device, and communications device, all communicatively coupled to each other. The local/cloud network is configured to communicate with at least one retailer through the cloud.

In operation, the smart cap is configured to be a passive device that is triggered by one of several events, where one such event is a robot/drone energizing the smart cap through non-contact energy means (primarily light) through illuminating the storage unit PV cell with light emanating from the robot lamp. Another potential event is the storage unit being opened through removal of the smart cap from the neck and the smart cap is left on a counter or other place where there is sufficient light and for a sufficient period of time (e.g., several seconds). Once the smart cap is properly repositioned on the neck, the high energy capacitive devices are sufficiently charged to boot up the dormant processing device to an active state with a light weight operating system. The booted processing device establishes communications with the robot through the storage unit and robot antennas. The high energy capacitive devices are also sufficiently charged to energize the plurality of interior lamps to illuminate the interior storage cavity of the container portion. The plurality of cameras are configured to capture images of the interior storage cavity when the cap is positioned on the container portion, and specifically, the level of the commodity as indicated by the level scales. These images are transmitted from the cameras to the processing device for further transmission to the robot. The images are transmitted to the robot through the storage unit antenna and the robot antenna. Accordingly, the robot is both an energy intermediary and a communications intermediary to the storage unit.

The robot processes and translates the image data received from the smart cap into information with respect to the present inventory in the storage unit. The robot transmits the image data to the local/cloud network through the robot and network antennas. The local/cloud network processes the information received from the robot and makes a first determination with respect to whether the imaged inventory level is below a predetermined threshold value. If the inventory level is not below the threshold value, the operation is complete for this commodity. If the inventory level for the commodity is below the threshold value, the network makes a second determination as to whether the container portion is empty. In addition, the captured image data of the inventory has sufficient clarity such that the local/cloud network will determine the nature of any remaining portions of the commodity. If the container portion is not empty, the robot removes the smart cap from the container portion, empties the remaining contents into a predetermined collection device, and places the empty container portion in a reserved area for the container portions. If the container portion is empty, the robot removes the smart cap from the container portion and places the empty container portion in the reserved area.

There are a number of operations that may be performed once the empty container portion is placed in the reserved area. In one embodiment, the local network orders a replacement container portion of the commodity from a retailer. The amount of the commodity ordered does not necessarily have to be a standard unit or standard units, i.e., any amount may be ordered. The retailer will arrive at the reserved area with the filled container portions ordered that have a temporary seal over the neck to protect the contents, pick up the empty container portion, and replace it with the filled, replacement container portion.

In another embodiment, the network orders any amount from the retailer and the retailer will pick up the empty container portions, transport them back to the retailer facility, wash and sterilize the container portions, refill the clean container portions, apply the seals, and return them to the reserved area.

In yet another embodiment, the network notifies the user that an empty container unit has been placed in the reserved area. The user then returns the empty container portion to the retailer that washes and sterilizes the container portions, and returns the cleaned container portions to the user. The user selects the commodities and the amounts to fill the container portions, and either the retailer or the user fills and seals the container portions, and the user returns the container portions to the reserved area.

Regardless of how the filled container portions arrive at the reserved area, the robot removes the seal on each container portion, places a smart cap on the container portion to restore the storage unit, and places the storage unit in the proper location. In at least one embodiment, any smart cap that is configured for the container portion may be used.

The interrogation of the storage units by the robot may be scheduled with any frequency that suits the user. For example, the robot may be programmed to perform the inventory at the same time every day. In addition, if the smart cap is placed in a sufficiently lighted area, the images of the contents therein may be taken by the cameras and either transmitted to the robot if the robot is within transmission distance, or store the image data until the robot is within range. Moreover, an inventory may be triggered through the user communicating directly through the local/cloud network.

The smart caps may be available in multiple sizes and configurations, and the necks of the container units may be configured to accept only particular configurations of the smart caps to facilitate proper imaging of the respective cavity with respect to the level scale, the interior lamps illumination cones, and the camera perspectives. The smart caps are content-neutral in that the processing devices of the smart caps are not programmed with any commodity-specific data, and the image data is not combined with content detail data until the robot uploads the image data to the network. Accordingly, the smart caps as described herein are interchangeable, within the limits of the coupling compatibilities, without any prior association with the contents of the storage units.

The use of refillable containers facilitates a reduction of use of plastic and paper bags, thereby providing at least some environmental benefits.

Referring to FIG. 1, a schematic diagram is provided illustrating a portion of a computing platform 100, i.e., a computer system 100 suitable for using smart storage units 102 and Internet of things (IoT) technology, and, more specifically, for substantially end-to-end autonomous management of consumable commodities. The computer system 100 includes a storage unit 102 that includes a container portion 104 and a smart cap 106. The container portion 104 includes a neck 110 that is configured to receive the smart cap 106 through a mechanical coupling that includes, without limitation, a threaded coupling, one or more snap couplings, and a friction fit (neither shown). The container portion 104 also includes a wall 112 that, in at least some embodiments, is sufficiently opaque to facilitate capturing internal images of the container portion 104 while decreasing interference from external light. In at least some embodiments, the wall 112 is substantially opaque to substantially prevent transmittance of light therethrough. In embodiment shown in FIG. 1, the wall 112 of the container portion 104 is cylindrical with a flat floor 114. In at least some embodiments, the wall 112 and floor 114 include one or more configurations including, without limitation, at least one or more of partially cylindrical and partially rectangular features. In other embodiments, the wall 112 and the floor 114 include any geometrical configuration that enables the embodiments of the computer system 100 as disclosed herein.

The wall 112 is further configured to at least partially define an interior storage cavity 116 that is configured to store a commodity 118 therein. In at least one embodiment, the geometry of the interior storage cavity 116 is substantially similar to the outside geometries of the wall 112 and the floor 114. In some embodiments, the geometry of the interior storage cavity 116 is substantially cylindrical or rectangular regardless of the geometries of the wall 112 and floor 114. In at least one embodiment, the commodity 118 is consumable and fungible. In at least some embodiments, the commodity 118 is a baking or cooking ingredient such as, and without limitation, curry, sugar, flour, cinnamon, and olive oil. In some embodiments, the commodities 118 are individually stored in individual storage units 102. In some embodiments, the commodities 118 are mixtures of two or more pure commodities 118, for example, and without limitation, a variety of commonly used spices in combination such as oregano and basil and garlic in olive oil. In some embodiments, the commodities 118 are not ingestible, for example, and without limitation, motor oil, grass seed, weed killer, and particular nuts or bolts. Therefore, the commodity 118 may be either solid or liquid, with a solid shown in FIG. 1. Also, in some embodiments, the commodity 118 is not fungible. For example, in some embodiments, the commodity 118 has an expiration date, and therefore, mixing various batches of the commodity 118 together may be inadvisable. In some embodiments, the commodity 118 is used with a regular frequency. In at least some embodiments, the commodity 118 is used irregularly or infrequently.

In at least some embodiments, the interior storage cavity 116 includes one or more level measurement scales 120 positioned therein. The level measurement scales 120 are positioned and configured to provide a visual measurement of the commodity 118 within the interior storage cavity 116. In at least one embodiment, the level measurement scales 120 include predetermined level units in the form of markings or inscriptions thereon that indicate a present level of the commodity 118. In some embodiments, the level indications 120 are numerical, with the numerals being simply sequential integers without reference to particular volume measurements, and numerals with reference to specific volumetric increments. In at least some embodiments, the level indications 120 are monochromatic in color, where the color of the level indications 120 are visually contrasted to the walls 112, the floor 114, and the commodity 118. In at least one embodiment, the level indications 120 include a plurality of differently colored blocks, where each color is indicative of a volumetric measurement.

The smart cap 106 includes at least one external energy generation source 130, such as, and without limitation a photovoltaic (PV) cell 130 configured to convert photonic energy received thereon to direct current (DC) electrical current at a predetermined voltage. In at least one embodiment, the PV cell 130 is configured to generate an electrical current within a range of approximately 100 milliampere (mA) to approximately 500 mA within a voltage range of approximately 4 volts DC to approximately 12 volts DC. The smart cap 106 also includes an electrical power storage device, that, in at least one embodiment, includes one or more high energy capacitive devices 132. The high energy capacitive devices 132 are coupled in electrical communication with the PV cell 130. The smart cap also includes at least one first processing device 134, i.e., a smart cap processing device 134. The smart cap processing device 134 includes a light-weight operating system (OS) (as discussed further herein) loaded thereon, where the smart cap processing device 134 includes sufficient processing capacity and onboard memory storage (not shown) to enable the smart cap 106 to operate as described further herein. In some embodiments, the onboard memory storage is non-volatile flash memory. In some embodiments, the smart cap 106 includes a separate memory device.

The smart cap 106 further includes one or more interior lamps 136 (two shown) to act as an interior light source for illuminating at least a portion of the commodity 118 and capturing images of the commodity 118. In at least one embodiment, the interior lamps 136 include light-emitting diode (LED) lamps to provide the predetermined level of lumens for a predetermined period of time. The interior lamps 136 are configured to generate a light beam 138 with a predetermined angle Θ of photon emission at a predetermined photon intensity such that the installed number of interior lamps 136 are sufficient to illuminate the remaining commodity 118, at least most, if not all, of the level scales 120, and the floor 114 within the interior storage cavity 116.

In addition, the smart cap 106 includes one or more imaging devices, i.e., cameras 140 (three shown), where each camera includes an aperture 142 (only one labeled for clarity). Each camera 140 is configured to capture an image of the remaining commodity 118 and the level scales 120. In one embodiment, each camera 140 is configured to capture a portion of the remaining commodity 118 and the level scales 120, and the separate images are combined in a subsequent operation. Moreover, the smart cap 106 includes a storage unit antenna 144 configurate to transmit information. In at least some embodiments, the storage unit antenna 144 is configured to transmit-only to preserve the finite energy resources. In some other embodiments, the storage unit antenna 144 is configured to transmit and receive. In some embodiments, the storage unit antenna 144 is omnidirectional. In some other embodiments, the storage unit antenna 144 is directional, where a directional antenna may facilitate lower energy usage for transmission, thereby preserving the finite energy supply. In some embodiments, the storage unit antenna 144 includes selectable features, either automated or operator-directed, between an omnidirectional state and a directional state as a function of the location of the target of the transmission (as discussed further herein).

In one or more embodiments, the plurality of storage units 102 are positioned in a plurality of areas. In at least one embodiment, a plurality of storage units 102 as described herein are positioned proximate each other, where each storage unit 102 is at least partially filled with a different commodity 118 therein. In one or more embodiments, more than one of the storage units 102 contains a similar, or identical, commodity 118.

In at least one embodiment, the computer system 100 includes a mobile assistant, i.e., a robot 150. The robot 150 includes a robot antenna 152 that is configured to obtain operable communication with the storage unit antenna 144. The robot antenna 152 is configured to transmit and receive. For example, the robot antenna 152 is configure to receive image data 154 from the storage unit antenna 144. For those embodiments where the storage unit antenna 144 is configured to receive transmissions from the robot 150, the robot antenna 152 is configured to transmit to the storage unit antenna 144. In some embodiments, the robot antenna 152 is omnidirectional. In some other embodiments, the robot antenna 152 is directional, where a directional antenna may facilitate lower energy usage for transmission, thereby preserving a finite energy supply. In some embodiments, the robot antenna 152 includes selectable features, either automated or operator-directed, between an omnidirectional state and a directional state as a function of the location of the target of the transmission, i.e., the storage unit antenna 144.

The robot 150 includes one or more external lighting devices, i.e., robot lamps 156 (only one shown). The one or more robot lamps 156 are configured to transmit a light beam 158 to illuminate the PV cell 130 with sufficient luminosity to energize the electrical power storage device 132 with sufficient electrical energy to enable operation of the smart cap 106 as described herein. The robot 150 also includes a second processing device 160, i.e., a robot processing device 160, a first memory device 162, i.e., a robot memory device 162, and a first communications device 164, i.e., a robot communications device 164, where the robot processing device 160, the robot memory device 162, and the robot communications device 164 are communicatively coupled to each other, and the robot communications device 164 is communicatively coupled to the robot antenna 152.

In at least one embodiment, the robot 150 includes one or more object handling devices, i.e., robot arms 166 (only one shown) that are configured to remove the smart cap 106 from the container portion 104 and to pick up, empty, and carry the container portion 104. The robot arms 166 include the necessary articulation, grasping, and strength features required to enable the robot arms 166 to operate as described herein. The robot 150 further includes the transport features necessary to enable the mobility of the robot 150 to execute the tasks as described herein. In some embodiments, the robot 150 includes a plurality of wheels 168, where the wheels 168 are configured to provide the robot 150 with turning features suitable for use in residential and commercial establishments, regardless of the configuration of those spaces. The robot 150 includes an onboard power supply (not shown) that is any device that provides the robot 150 with sufficient electrical power to enable operation of the robot 150 as described herein.

Figure 2:
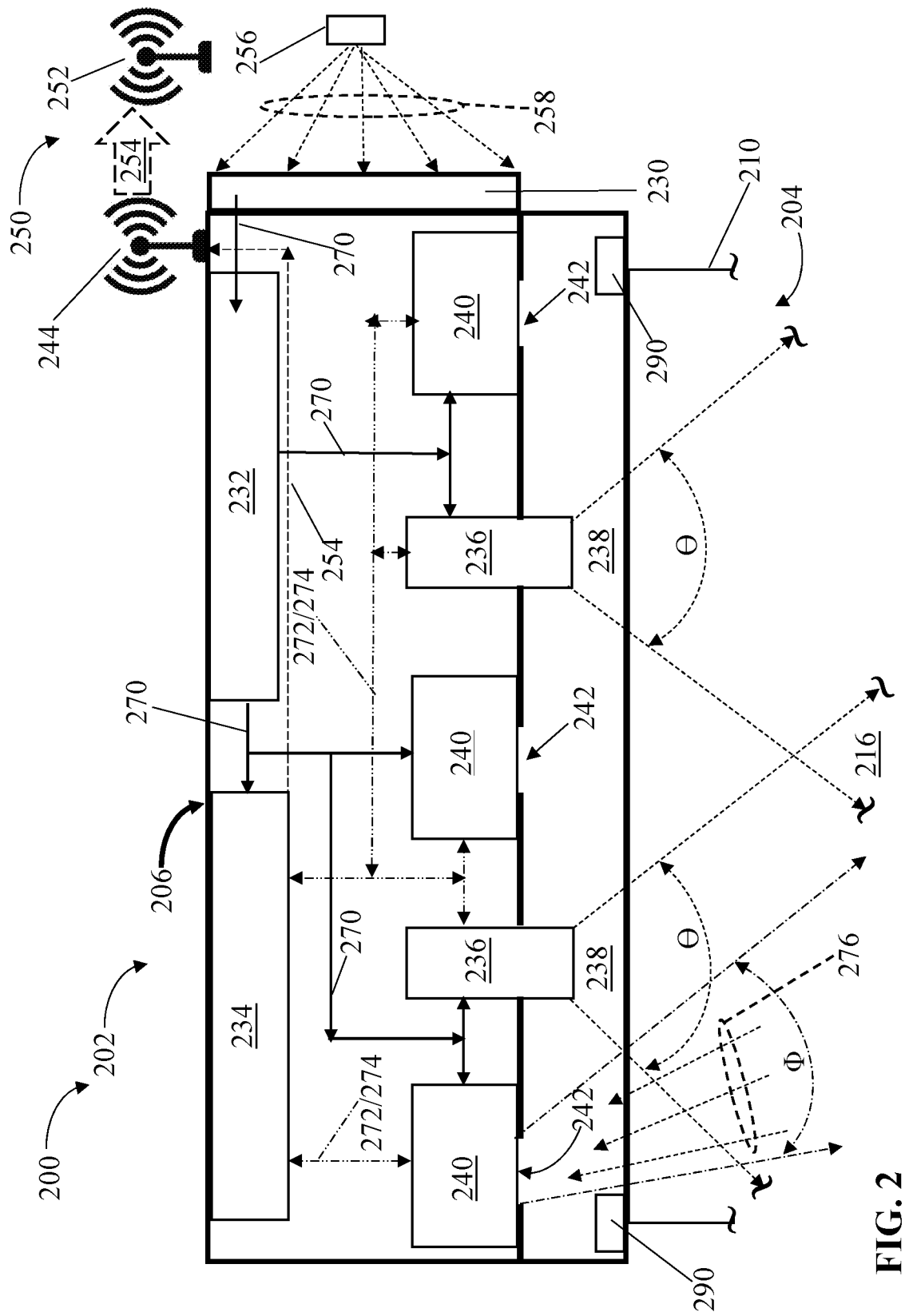
FIG. 2 is a schematic diagram illustrating a magnified view of a portion of the computer system, in accordance with some embodiments of the present disclosure.

Referring to FIG. 2, a schematic diagram is provided illustrating a magnified view of a portion of the computer system 200. Also, referring to FIG. 1, the computer system 200 includes the storage unit 202 that includes the container portion 204 and the smart cap 206, where the smart cap 206 is shown magnified from smart cap 106 in FIG. 1. The high energy capacitive devices 232 are electrically coupled to the PV cell 230 and DC electric power 270 is transmitted from the PV cell 230 to the high energy capacitive devices 232. The PV cell 230 receives the light beam 258 from the robot lamp 256 and converts the photonic energy into electric power 270. The luminescence of the light beam 258 is sufficient to illuminate the PV cell 230 for approximately several seconds and transmit sufficient energy to the smart cap 206 to execute the operations as described herein. In at least some embodiments, the time frame for illuminating the PV cell is approximately 10 seconds to approximately 30 seconds. Alternatively, in some embodiments the time from for illuminating the PV cell 230 is any period of time that enables operation of the storage unit 202 as described herein.

The high energy capacitive devices 232 are electrically coupled to the smart cap processing device 234, the interior lamps 236, and the cameras 240. Therefore, the smart cap processing device 234, the interior lamps 236, and the cameras 240 all receive a portion of the electric power 270.

The smart cap processing device 234 is configured to receive the electric power 270 that energizes the smart cap processing device 234 that initiates the associated booting sequence, thereby transitioning the smart cap 106 from a dormant state to an active state. A light-weight operating system embedded within the smart cap processing device 234 is booted. The term "light-weight" refers to the amount of coded instructions resident therein, where there are only sufficient instructions to perform the tasks described herein. Once the tasks are completed, and the energy within the high energy capacitive devices 232 is depleted, the operating system places the smart cap processing device 234 into the dormant state from the active state and the smart cap 206 remains a passive device. When the smart cap processing device 234 is fully booted and functional, the smart cap processing device 234 performs the actions necessary to establish communications with the robot 250 through the storage unit antenna 244 and the robot antenna 252. The smart cap processing device 234 transmits instructions 272 to the plurality of cameras 240 and the interior lamps 236. In some embodiments, the cameras 240 and the interior lamps 236 transmit reports 274 to the smart cap processing device 234 that the assigned tasks per the instructions 272 are completed, or not completed.

In addition, the smart cap processing device 234 captures inventory data of the contents, i.e., the commodity 118 within the container portion 204 of the storage unit 202. To capture the inventory data of the commodity 118, the smart cap processing device 234 energizes the plurality of interior lamps 236 to illuminate the interior storage cavity 216 of the container portion 204. Specifically, the interior lamps 236 are configured to generate the light beam 238 with the predetermined angle Θ of photon emission at a predetermined photon intensity such that the installed number of interior lamps 236 are sufficient to illuminate the remaining commodity 118, at least most, if not all, of the level scales 120, and the floor 114 within the interior storage cavity 216.

Moreover, the smart cap processing device 234 energizes the plurality of cameras 240 that are configured to capture images of the interior storage cavity 216, and specifically, the level of the commodity 118 as indicated by the level scales 120 that is illuminated by the light beams 238. Specifically, the apertures 242 of the cameras 240 open to capture light rays 276 reflected from the wall 112, floor 114, commodity 118, and the level scales 120 within an aperture angle 1. The cameras 240 are configured to capture the image data with sufficient clarity that the remaining contents within the are visually discernable. Once the images are transmitted to the smart cap processing device 234, the smart cap processing device 234 transmits the image data to the robot 250 through the storage unit antenna 244 to the robot antenna 252 as image data transmissions 254. In some embodiments, the robot 250 will acknowledge receipt of the image data transmissions 254 to the smart cap processing device 234. Upon completion of transmitting the image data transmissions 254, the smart cap processing device 234 deenergizes the cameras 240 and interior lamps 236, and returns to a dormant state from the active state.

In at least some embodiments, and as shown in FIG. 2, the smart cap 206 includes one or more pressure sensors 290. In at least some other embodiments, the one or more pressure sensors 290 are positioned on the neck 210 (not shown). Regardless of the precise location of the pressure sensors 290, the pressure sensors 290 are positioned and oriented on either (or both) the smart cap 206 and/or the neck 210 in any manner that enables operation of the smart cap 206 as described herein. As described further herein, the pressure sensors 290 act as a permissive to facilitate preventing the smart cap 206 from capturing images when not securely coupled to the neck 210 of the container portion 204. In at least one embodiment, the pressure sensors 290 have piezoelectric features that enable the pressure sensors 290 to operate as pressure switches (as described further herein). The pressure sensors 290 are communicatively coupled to the processing device 234 (coupling not shown for clarity) and have sufficient voltage generating capacity to transmit a threshold signal (not shown for clarity) to operate as a permissive signal to the processing device 234 such that the smart cap 206 is sufficiently positioned on and secured to the neck 210 such that images may be successfully captured with minimal intrusion of outside light. Accordingly, the smart cap 206 includes features to prevent operation of the cameras 240 through mere exposure of the PV cell 230 to ambient light with the smart cap 206 removed from the neck 210 during routine user access to the commodity 118, or in the circumstances where the smart cap 206 has been improperly affixed to the neck 210.

Referring again to FIG. 1, the robot antenna 152 is configured to receive the image data 154 from the smart cap 106. The image data 154 are transmitted to the communications device 164 that converts the image data 154 to image data 178 that is transmitted to the robot processing device 160. The robot processing device 160 receives the image data 178 that includes the one or more images of the one or more measurement scales 120 and analyzes the images to verify adequacy of the image data. In some embodiments, if the image data 178 is corrupted or otherwise inadequate, the robot 150 may be instructed through the robot processing unit 160 to re-execute the capturing of the images from that particular storage unit 102. In at least some embodiments, the processed image data 180 is saved in the robot memory device 162 for further use as described herein.

In some embodiments, the robot 150 includes a plurality of robot lamps 156 to facilitate energizing a plurality of smart caps 106 simultaneously. Similarly, the robot antenna 152 is configured to receive a plurality of streams of image data 154, where each of image data 154 includes one or more identification tags embedded therein to reduce a potential of mixing the image data 154. Accordingly, the robot 150 is both an energy intermediary and a communications intermediary to the storage unit 102.

Figure 3:
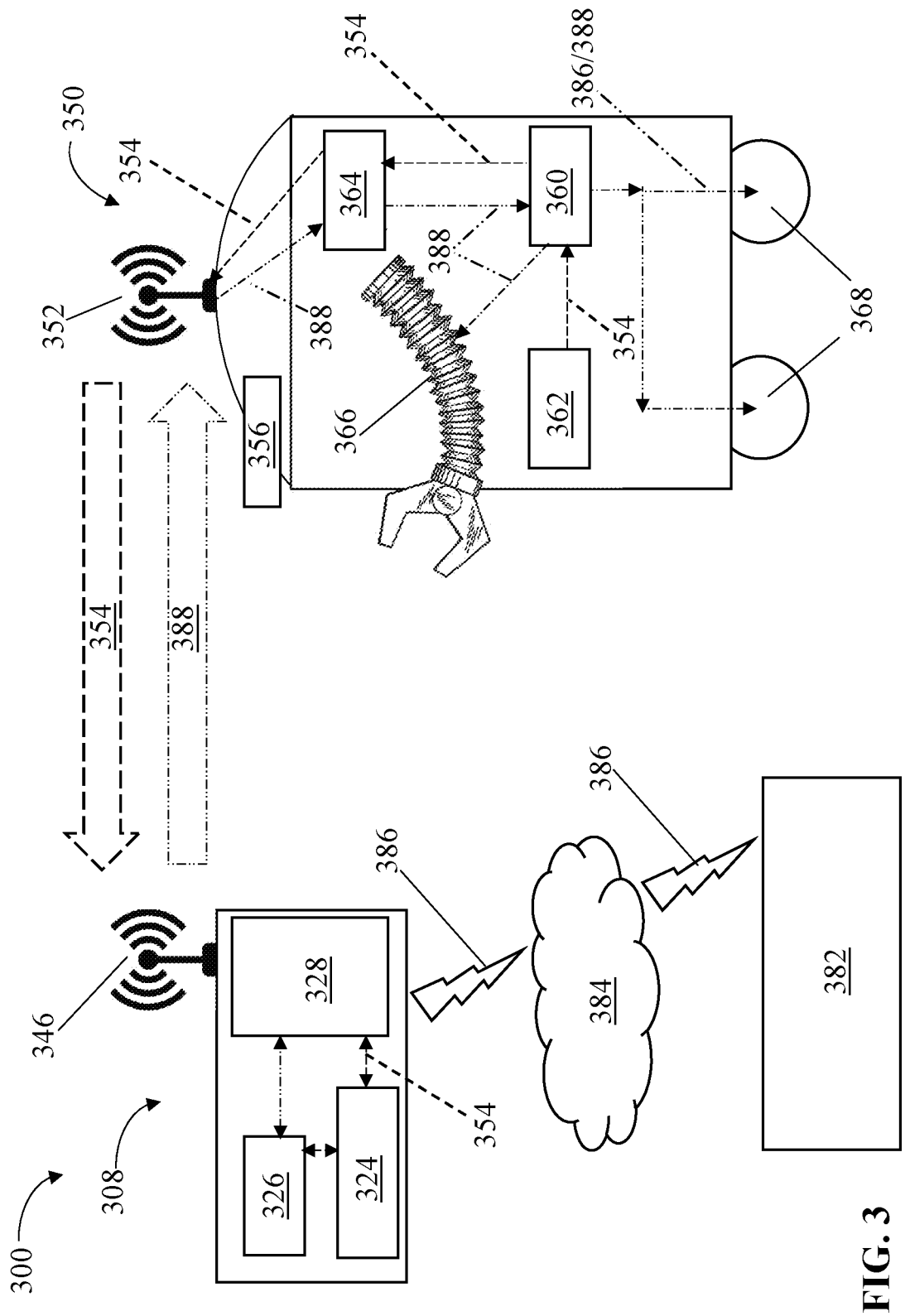
FIG. 3 is a schematic diagram illustrating another portion of the computer system suitable for using smart storage units and Internet of things (IoT) technology, and, more specifically, for substantially end-to-end autonomous management of consumable commodities, in accordance with some embodiments of the present disclosure.

Referring to FIG. 3, a schematic diagram is provided illustrating another portion of the computer system 300 suitable for using smart storage units and Internet of things (IoT) technology, and, more specifically, for substantially end-to-end autonomous management of consumable commodities. The computer system 300 includes a local/cloud network 308 that is communicatively coupled to the robot 350. The local/cloud network 308 includes a third processing device 324, i.e., a network processing device 324, a second memory device 326, i.e., a network memory device 326, and a second communications device 328, i.e., a network communications device 328. The network processing device 324, the network memory device 326, and the network communications device 328 are communicatively coupled to each other. The local/cloud network 308 also includes a network antenna 346 that is communicatively coupled to the communications device 328. The network antenna 346 is also communicatively coupled to the robot antenna 352. the communications device 328 is further communicatively coupled to one or more material suppliers, e.g., and without limitation, retail establishments 382 through the cloud 384. In some embodiments, the network antenna 346 is omnidirectional. In some other embodiments, the network antenna 346 is directional, where a directional antenna may facilitate lower energy usage for transmission, thereby preserving the finite energy supply. In some embodiments, the network antenna 346 includes selectable features, either automated or operator-directed, between an omnidirectional state and a directional state as a function of the location of the target of the transmission (as discussed further herein).

Referring to FIGS. 1 and 3, in at least one embodiment, the robot arms 366 and the robot wheels 368 of the robot 350 are in operable communication with the robot processing device 360. The robot processing device 360 drives the wheels 368 of the robot 350 to the vicinity of the network antenna 346 through instructions 388. The robot processing device 360 is also configured to transmit the image data 354 to the network processing device 324 from the robot memory device 362, the robot processing device 360, the robot communications device 364, the robot antenna 352, the network antenna 346, and the network communications device 328. The network processing device 324 is configured to receive the image data 354 and determine if the inventory of the commodity 118 is at or below a predetermined threshold. If the inventory of the commodity 118 is above the predetermined threshold, no further action will be taken. In addition, the network processing device 324 is configured to analyze the image data 354 to determine the identity of the respectively commodity 118 for reordering purposes.

If the inventory of the commodity 118 is at or below the predetermined threshold, the network processing device 324 is configured to determine the interior storage cavity 116 requires filling with additional commodity 118. The network processing device 324 will transmit a commercial order 386 to the retail establishment 382 through the cloud 384. The commercial order 386 for the additional commodity 118 may be any amount, including amounts that are not standard units, for example, and without limitation, 0.63 kilograms (kg) and 1.77 liters. In some embodiments, the commercial order 386 may only request a filling of the container portion 104 with the amount of the commodity 118 to be determined at filling. The network processing device 324 will transmit a plurality of instructions 388 to the robot 350 through the network antenna 346 and the robot antenna 352 to the robot memory device 362 for processing by the robot processing device 360. The instructions 388 cause the robot processing device 360 to direct the robot wheels 368 to transport the robot 350 to the proximate location of the smart cap 106 that has remained coupled to the neck 110 of the storage unit 102. The instructions 388 further cause the robot 350 to direct the robot arms 366 to uncouple the smart cap 106 from the container portion 104. Moreover, the instructions 388 direct the robot arms 366 and the robot wheels 368 to transport the container portion 104 to a predetermined, reserved location (not shown) for transport to the retail establishment 382. Once the container portion 104 is positioned at the predetermined, reserved location, the robot 350 will either enter the dormant state, or perform similar tasks for other storage units 102. In at least one embodiment, the robot 350 has taken the inventories of all predetermined storage units 102 and has communicated all such inventories to the local/cloud network 308 such that a complete order 386 is transmitted to the retail establishment 382.

When the container portions 104 are returned to the reserved area after filling (discussed further herein), and subject to a notification of a return of the container portions 104 to the reserved area, the robot 150 is directed to the reserved area, transport the container portions 104 to the proximate location of the smart cap 106, remove any temporary sealing devices (e.g., without limitation, a cellophane cover), and use the robot arms 166 to couple the container cap 106 to the container portion 104 and place the storage unit 102 back to the proper location with the PV cell 130 oriented for successful illumination by the robot lamps 156 in a subsequent operation.

Figure 4:
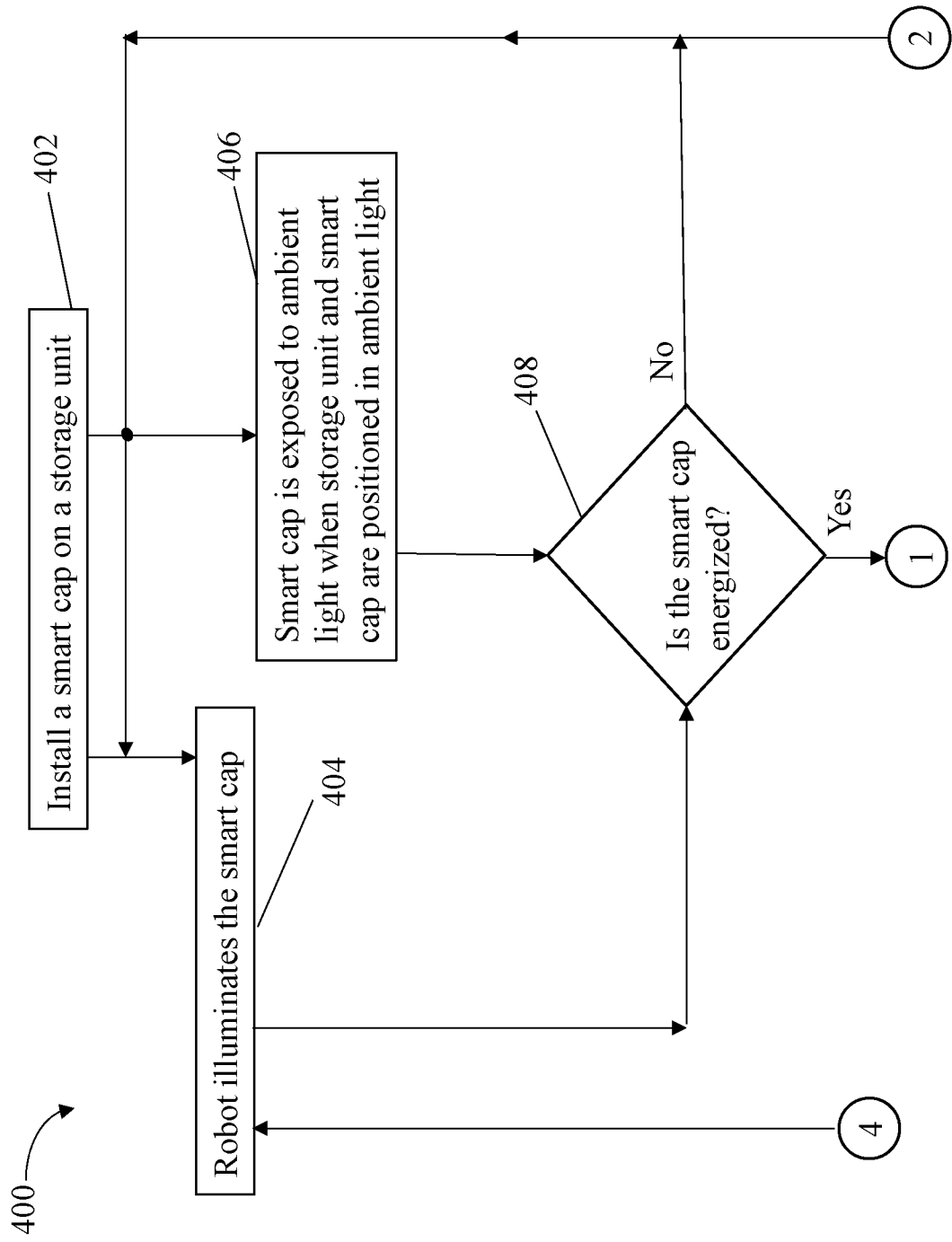
FIG. 4 is a flow chart illustrating a process for substantially end-to-end autonomous management of consumable commodities, in accordance with some embodiments of the present disclosure.
Figure 4:
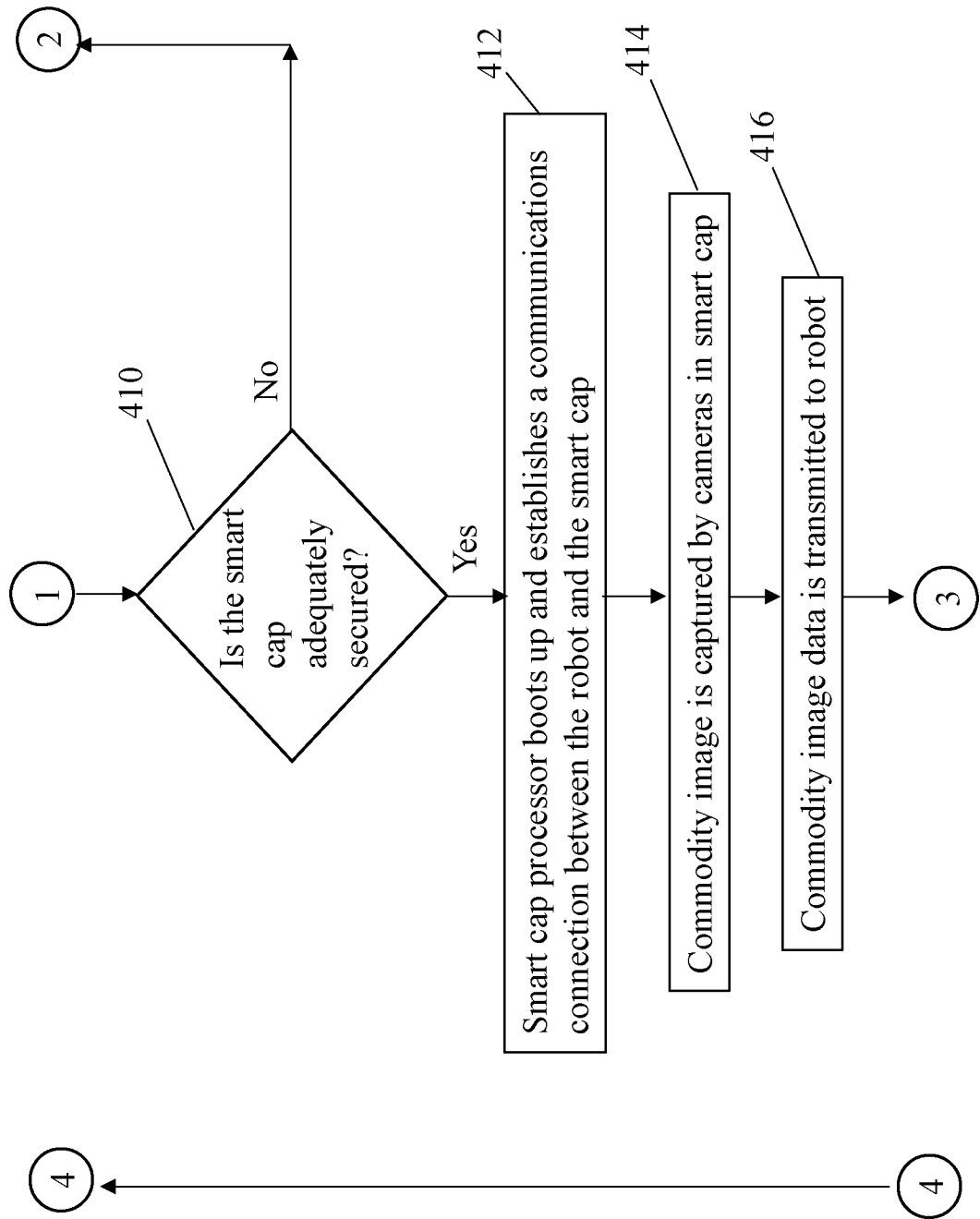
Figure 4:
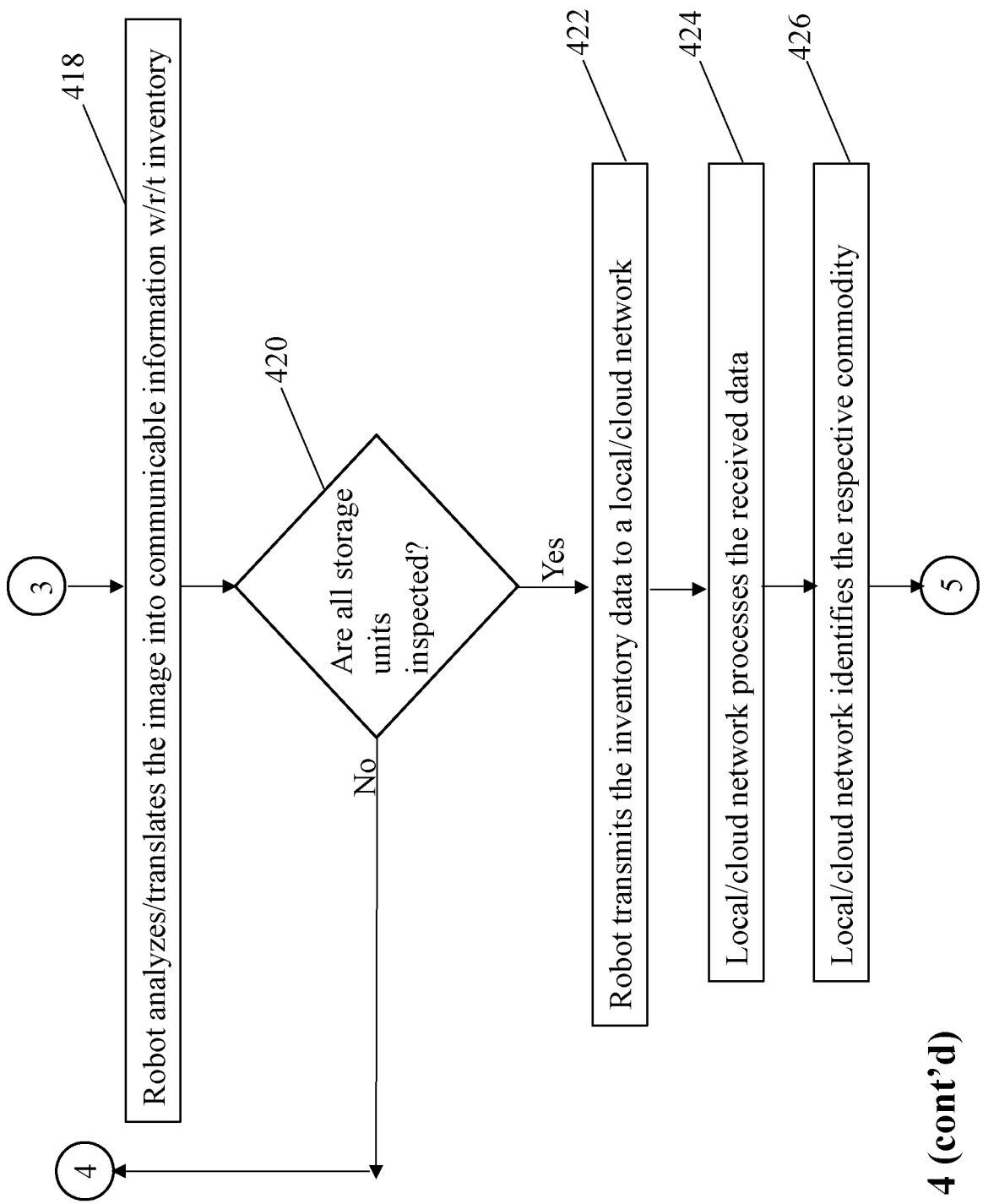
Figure 4:
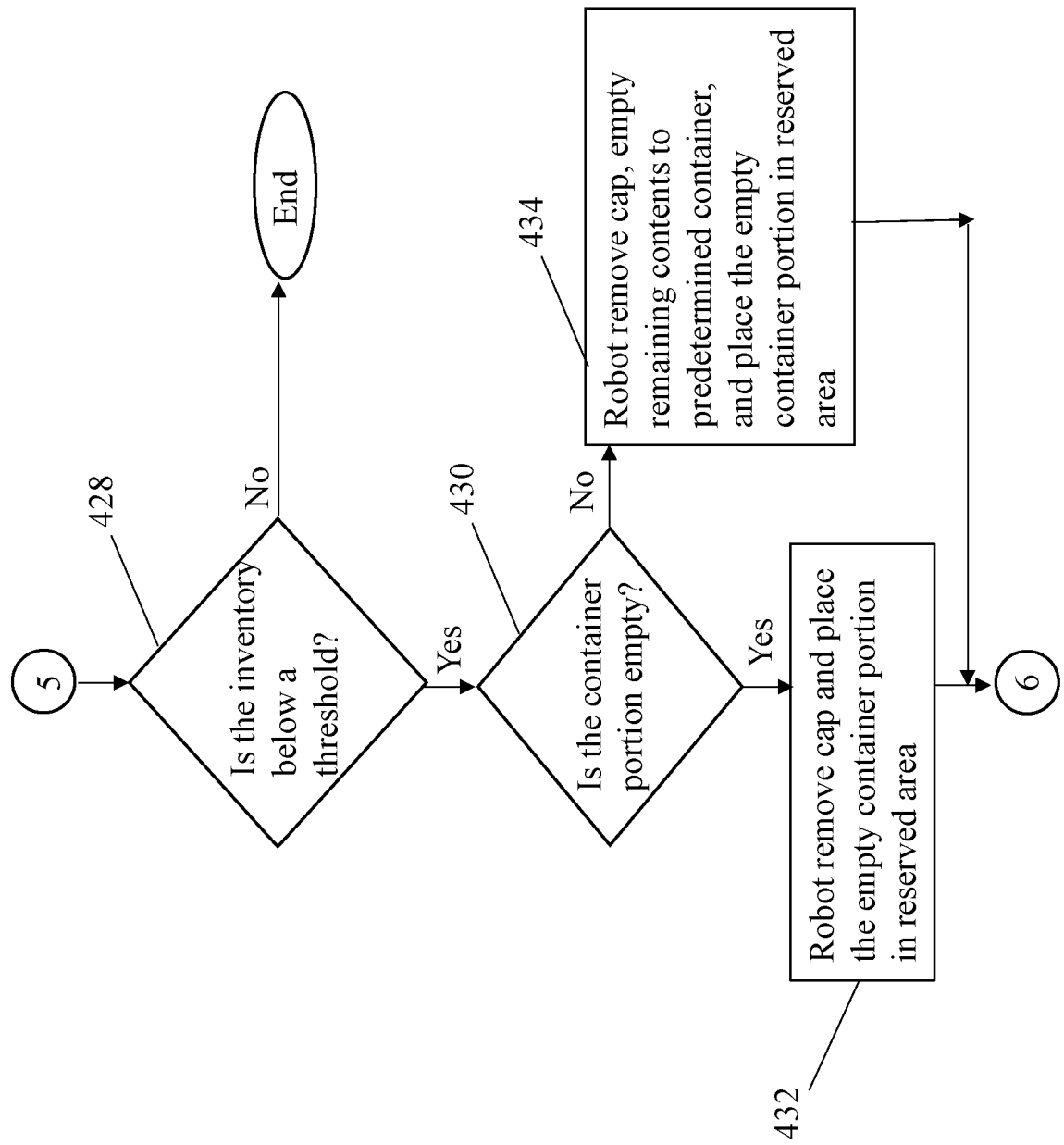
Figure 4:
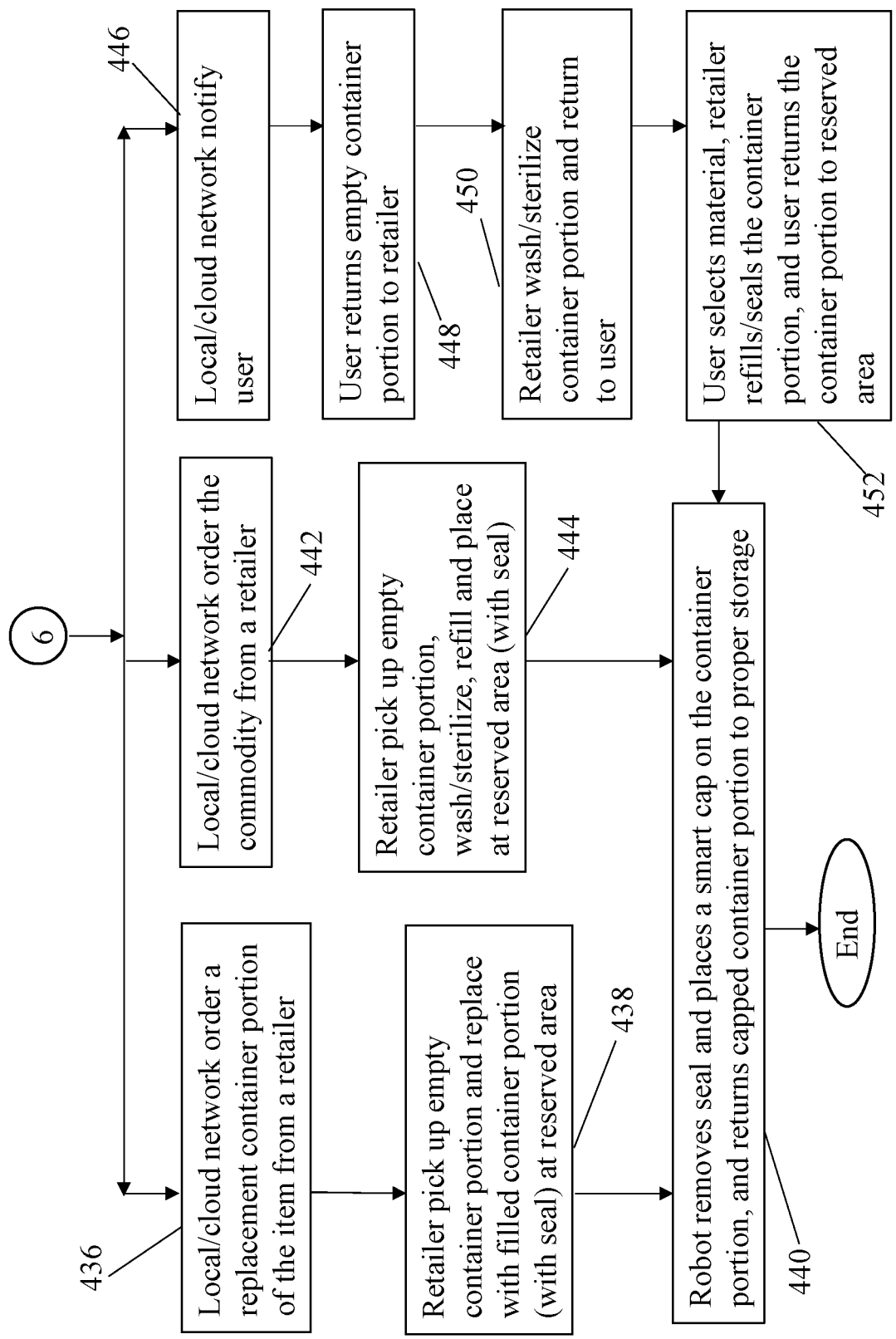

Referring to FIG. 4, a flow chart is presented illustrating a process 400 for substantially end-to-end autonomous management of consumable commodities. The process 400 includes installing 402 a smart cap 106 on a storage unit 102. Also referring to FIGS. 1-3, in at least one embodiment, the robot 150 is typically in a dormant state. In at least one embodiment, the computer system 100 is configured to perform an inventory on a predetermined basis. The interrogation of the storage units 102 by the robot 150 may be scheduled with any frequency that suits the user. For example, the robot 150 may be programmed to perform the inventory at the same time every day. The robot 150 enters an active state from a dormant state, travels to the storage units 102, and the robot 150 illuminates 404 the smart cap 106 and the smart cap 106 converts the photonic energy from the light beam 158 on the PV cell 130 as described herein.

In at least some embodiments, the smart cap 106 is exposed 406 to ambient light when the storage unit 102, and specifically, the smart cap 106 is positioned in ambient light. When the PV cell 130 of the smart cap 106 is placed in a sufficiently lighted area, while remaining coupled to the container portion 104, the images of the contents therein may be taken by the cameras 140 and either transmitted to the robot 150 if the robot 150 is within transmission distance, or store the image data 154 within a non-volatile portion of the smart cap processing device 134, e.g. and without limitation, onboard memory storage that in at least some embodiments, is non-volatile flash memory. In some embodiments, the image data 154 is stored within a separate memory device. If the smart cap 106 is permitted to reenter its dormant state, the image data will be stored until the robot 150 is within range. This alternative operation provides for opportunities to take an immediate inventory when the storage unit 102 is opened by the user to remove a portion of the commodity 118 from the container portion 104 and the smart cap 106 is restored. As described elsewhere herein, the smart cap 106 (206 in FIG. 2) includes one or more pressure sensors 290 that are positioned on either of (or both) the smart cap 106 and the neck 110 to sense proper engagement between the smart cap 106 and the neck 110. These pressure sensors 290 facilitate this alternative operation while preventing operation of the cameras 140 while the smart cap 106 is removed from the neck 110 as discussed further herein.

The process 400 includes a determination 408 made with respect to the smart cap 106 being energized. If there is a negative response to the determination operation 408, it is an indication that the PV cell 130 is not charging the high energy capacitive devices 132, and the lack of a response from the smart cap 106 after a predetermined period of time, the process 400 returns to the illumination operation 404. A positive response to the determination operation 408 results in a determination 410 if the smart cap 106 is adequately secured to the neck 110 through the pressure sensors 290. A positive response to the determination operation 410 is indicative of the pressure sensors 290 sensing sufficient pressure thereon to generate at least the threshold voltage that is transmitted to the processing unit 134. The receipt of the appropriate voltage signals by the processing unit 134 results in a permissive to allow the process 400 to proceed to the smart cap 106 energizing and initiating a boot 412 of the smart cap processing device 134. In at least one embodiment, when the smart cap processing device 134 is fully booted and functional, the smart cap processing device 134 performs the actions necessary to establish communications with the robot 150 through the storage unit antenna 144 and the robot antenna 152.

In the event of a negative response to the determination operation 410, the process 400 returns to either of the operations 404 and 406. The negative response to the determination operation 410 is indicative of the smart cap 106 not sufficiently secured to the neck 110 such that the voltage from the pressure sensors 290 does not attain the threshold value to provide the permissive for booting of the processing unit 134.

In at least one embodiment, the storage unit 102 is located in its usual location when the robot executes the illumination operation 404. If the smart cap 106 is not correctly affixed to the neck 110, the PV cell 130 device will be sufficiently charged to boot up 412 the processing unit 134, but as the pressure sensors 290 are not mechanically stressed to a sufficient pressure, the processing device 134 will abort the boot process 412. In some embodiments, there is sufficient logic embedded within the processing unit 134 such that to initiate the boot process operation 412, it is verified that the voltage threshold permissive is transmitted from the pressure sensors 290 to indicate that the smart cap 106 is properly engaged with the neck 110. In at least some embodiments, only one pressure sensor 290 is used. In at least one other embodiment, two or more pressure sensors 290 are used and the permissive logic is either configured in parallel for just one of the permissive threshold voltage signals necessary to be received to initiate the boot process 412, or configured in series to require all permissive threshold voltage signals necessary to be received to initiate the boot process 412.

Regardless, if the logic fails due to lack of receipt of the permissive signals, the boot process will abort and no signals will be sent to the robot 150. In this case, when no smart cap 106-to-robot 150 communication is established, the robot 150 includes sufficient programming to properly affix the smart cap 106 to the neck 110. In addition, the robot 150 is not programmed to immediately act to properly affix the smart cap 150 as there is a possibility that user is removing the commodity 118 from the container portion 104. Under such conditions, the smart cap 106 is placed on the counter surface (or similar location) where sufficient light to illuminate the PV cell 130 is received. However, the pressure sensors 290 cannot even partially indicate engagement since the smart cap 106 and the neck 110 are fully separated from each other, even though there is sufficient energy within the PV cell 130 to initiate the boot process 412 of the processing device 134. Hence the robot 150 will be programmed to act only after certain iterations of the boot process operation 410 failing. For example, in at least one embodiment, after 10 iterations of the operation 406 (or operation 404) to the operation 410 loop, where the boot process operation 412 fails, the robot 150 will go and check the status of the smart cap 150 and the neck 110 and will correct any tightness deficiencies if the smart cap 106 and the neck are not properly engaged. The most likely cause of this scenario may be the circumstances where a user has opened the storage unit 102 to take out some commodity 118 present in the container portion 104 and has not affixed the smart cap 106 on the neck 110 tightly enough for the pressure sensors 290 to induce the threshold voltage to generate the permissive to boot up the processing device 134. Alternatively, the user may not have properly affixed the smart cap 106 to the neck 110.

The process 400 continues with capturing 414 one or more images of the commodity 118. The interior lamps 136 generate the light beam 138 to illuminate the remaining commodity 118, at least most, if not all, of the level scales 120, and the floor 114 within the interior storage cavity 116. Each camera 140 is configured to capture a portion of the remaining commodity 118 and the level scales 120. The captured commodity image data 154 is transmitted 416 from the storage unit antenna 144 to the robot antenna 152. The quality and clarity of the commodity image data 154 is sufficient to facilitate identification of the material features of the remaining commodity 118. In at least one embodiment, the commodity image data 154 will be erased when the smart cap 106 shifts to the dormant state. Once the commodity image data 154 is received by the robot 150, the robot processing device 160 analyzes 418 the commodity image data 154 and translates the commodity image data into communicable information with respect to the inventory of the commodity 118. Specifically, the communications device 164 converts the image data 154 to image data 178 that is transmitted to the robot processing device 160.

The process 400 proceeds to a determination 420 if all of the storage units 102 that are to inspected have in fact been inspected. For a negative response to the determination operation 420, the operations 404 through 420 will be repeated for each storage unit 102. A positive response to the determination operation 420 results in the process 400 proceeding to the robot 150 travelling to the network antenna 346 to transmit 422 the image data 354 to the network antenna 346 of the local/cloud network 308 from the robot antenna 152.

The local/cloud network 308 processes 424 the received image data 354 In at least one embodiment, the network processing device 324 identifies 426 the respective commodity 118 through analysis of the received image data 354. The received image data 354 includes image data of sufficient quality that the network processing device 324 distinguishes the respective commodity 118 from all other commodities. In at least some embodiments, the network processing device 324 includes sufficient cognitive learning features to enable learning of subtle distinguishing characteristics of the varying commodities. For example, and without limitation, the network processing device 354 discerns liquids from solids, powders from granules, colors, textures, and shapes to accurately identify the respective commodity 118. Further, for example, and without limitation, the network processing device 324 distinguishes between curry powder and seasoned salt granules, cold breakfast cereal from oatmeal, baking soda from baking powder, and bread crumbs from corn meal. The commodity identification features of the local/cloud network 308 through analyzing the received image data 354 facilitates the interchangeability of the caps 106, since the caps 106 are not directly associated with any one commodity 118. Accordingly, identification of the respective commodity 118 by the local/cloud network 308 to facilitate proper ordering is performed.

The network processing device 324 executes a determination 428 as to whether the recorded inventories of the commodities 118 are at or below their predetermined and respective threshold levels. A negative response to the determination operation 428 results in no further action taken and the process 400 ends. In some embodiments, the robot 150 will return to it's predetermined resting area and shift from the active state to the dormant state until the next inventory cycle is initiated.

A positive response to the determination operation 428 results in the process 400 proceeding to a determination operation 430 if the associated container portions 104 are completely empty. A positive response to the determination operation 430 results in the network processing device 324 transmitting a plurality of instructions 388 to the robot 350 through the network antenna 346 and the robot antenna 352 to the robot memory device 362 for processing by the robot processing device 360. The instructions 388 cause the robot processing device 360 to direct the robot wheels 368 to transport the robot 350 to the proximate location of the smart cap 106 that has remained coupled to the neck 110 of the storage unit 102. The instructions 388 further cause the robot 350 to direct the robot arms 366 to uncouple 432 the smart cap 106 from the container portion 104. Moreover, the instructions 388 direct the robot arms 366 and the robot wheels 368 to transport 432 the container portion 104 to a predetermined location (reserved area) (not shown) for transport to the retail establishment 382. Once the container portion 104 is positioned at the reserved area, the robot 350 will either enter a quiet, or dormant state, or perform similar tasks for other storage units 102. A negative response to the determination operation 430 results in a similar result as the positive response with the principle difference being that the instructions 388 to the robot 350 include using the robot arms 366 to empty 434 any remaining contents in the respective container portion 104 into a predetermined receptacle (not shown) for future disposal or use.

In some embodiments, the operations 432 and 434 also include placing the smart cap 106 into a reserved area where the PV cell 130 will not be exposed to sufficient ambient light to attempt to initiate a boot of the processing device 134, that will fail due to the lack of permissive signals from the pressure sensors 290.

There are a number of operations that may be performed once the empty container portion 104 is placed in the reserved area by the robot 150 per operations 432 and 434. In at least one embodiment, the service provided by the retail establishment 382 dovetails with the activities of the computer system 100 to seamlessly maintain the inventories of the various commodities 118 above the threshold level with replacement, from the perspective of the user, and with no direct interaction with the user. The local/cloud network 308 orders 434 a replacement container portion 104 of the commodity 118 from the retail establishment 382. In some embodiments, the local/cloud network 308 has transmitted a complete order 386 to the retail establishment 382 for a plurality of container portions 104. The amount of the commodity ordered does not necessarily have to be a standard unit or standard units, i.e., any amount may be ordered.

A representative of the retail establishment 382 will arrive at the reserved area with the ordered filled container portions 104 that have a temporary seal over the neck 110 to protect the commodity 118 contents, pick up 438 the empty container portions 104, and replace them with the filled, replacement container portions 104. In at least one embodiment, the retail establishment 382 notifies the local/cloud network 308 through the cloud 384 that the replacement container portions 104 are positioned at the reserved area. Subject to such notification, the robot 150 is transported to the reserved area by the robot wheels 168 to use the robot arms 166 to transport the filled container portion 104 to the proximate location of the smart cap 106. The robot 150 removes 440 a temporary seal positioned over the neck 110 of the container portion 104 and couples, through the one or more robot arms 166, the smart cap 106 to the container portion 104. Once the respective storage unit 102 is reassembled by the robot 150, the instructions 388 to the robot 150 include instructions to place the storage unit 102 back to the proper location with the PV cell 130 oriented for successful illumination by the robot lamps 156 in a subsequent operation. Subsequently, once all of the storage units 102 are properly placed, the process 400 ends.

In at least some embodiments, once the empty container portions 104 are placed in the reserved area by the robot 150 per operations 432 and 434, the service provided by the retail establishment 382 again dovetails seamlessly, from the perspective of the user, and with no direct interaction with the user, with the activities of the computer system 100 to maintain the inventories of the various commodities 118 above the threshold level with replacement. The local/cloud network 308 orders 442 replacement commodities 118 from the retail establishment 382. In some embodiments, the local/cloud network 308 has transmitted a complete order 386 to the retail establishment 382 for a plurality of replacement commodities 118. The amount of the commodity ordered does not necessarily have to be a standard unit or standard units, i.e., any amount may be ordered.

A representative of the retail establishment 382 will arrive at the reserved area, pick up 444 the empty container portions 104, transport the empty container portions 104 to a cleaning facility, wash and sterilize the empty container portions 104, refill them with the respective commodities 118, place a seal over each of the necks 110 to protect the commodity 118 contents, and return the refilled container portions 104 to the reserved area. In at least one embodiment, the retail establishment 382 notifies the local/cloud network 308 through the cloud 384 that the replacement container portions 104 are positioned at the reserved area. Subject to such notification, the robot 150 is transported to the reserved area by the robot wheels 168 to use the robot arms 166 to transport the filled container portion 104 to the proximate location of the smart cap 106. The robot 150 removes 440 the temporary seal and couples, through the one or more robot arms 166, the smart cap 106 to the container portion 104. Once the respective storage unit 102 is reassembled by the robot 150, the instructions 388 to the robot 150 include instructions to place the storage unit 102 back to the proper location with the PV cell 130 oriented for successful illumination by the robot lamps 156 in a subsequent operation. Subsequently, once all of the storage units 102 are properly placed, the process 400 ends.

In at least some embodiments, once the empty container portions 104 are placed in the reserved area by the robot 150 per operations 432 and 434, the local/cloud network 308 notifies 446 the user through any mechanism the user typically uses to communicate with the local/cloud network 308, including, without limitation, the cloud 384. The user collects the empty container portions 104 and returns 448 them to the retail establishment. The retail establishment washes 450 and sterilizes the empty container portions 104 and returns them to the user. The user selects 452 the material, or commodity 118 and the amount to be purchased. The amount of the commodity ordered does not necessarily have to be a standard unit or standard units, i.e., any amount may be ordered. The user refills them with the respective commodities 118, places a temporary seal over each of the necks 110 to protect the commodity 118 contents, and returns the refilled container portions 104 to the reserved area. In at least one embodiment, the user notifies the local/cloud network 308 through the cloud 384 that the replacement container portions 104 are positioned at the reserved area. Subject to such notification, the robot 150 is transported to the reserved area by the robot wheels 168 to use the robot arms 166 to transport the filled container portion 104 to the proximate location of the smart cap 106. The robot 150 removes 436 the temporary seal and couples, through the one or more robot arms 166, the smart cap 106 to the container portion 104. Once the respective storage unit 102 is reassembled by the robot 150, the instructions 388 to the robot 150 include instructions to place the storage unit 102 back to the proper location with the PV cell 130 oriented for successful illumination by the robot lamps 156 in a subsequent operation. Subsequently, once all of the storage units 102 are properly placed, the process 400 ends.

In addition to residential uses, the embodiments of the storage units 102 facilitate similar improvements in retail operations. For example, and without limitation, bakeries and pizza outlets may use the storage units 102 for the non-perpetual ingredients such as flour and sugar, as compared to perpetual ingredients such as water. The process 400 for using automation to manage the inventories decreases the efforts of the human resources for the businesses, facilitates improved inventory estimations, usage rates, and wastage. Further retail embodiments include use in large retail stores, where, for example, automated inventory management as disclosed herein facilitates a reduction in the volume of overstock of particular stock keeping units (SKUs), thereby facilitating more effective use of limited floor and shelf space, especially with respect to SKUs of different, non-standard, or large sizes and shapes. Also, as described herein, increases the flexibility in ordering non-standard quantities by the retail establishment on a larger scale and the customers on a smaller scale. Furthermore, with respect to grocery stores, the embodiments described herein may be extended to fruits and vegetables according to the customer's usage of such items, thereby decreasing wastage and the associated costs. Moreover, with respect to the grocery store embodiments, the costs of packaging by the suppliers of the commodities may be reduced, thereby providing at least some economic advantages to the vendors. In addition, many consumers will benefit from the more economical quantities and the retail establishments will benefit from sales that they may not otherwise have experienced.

Figure 5:
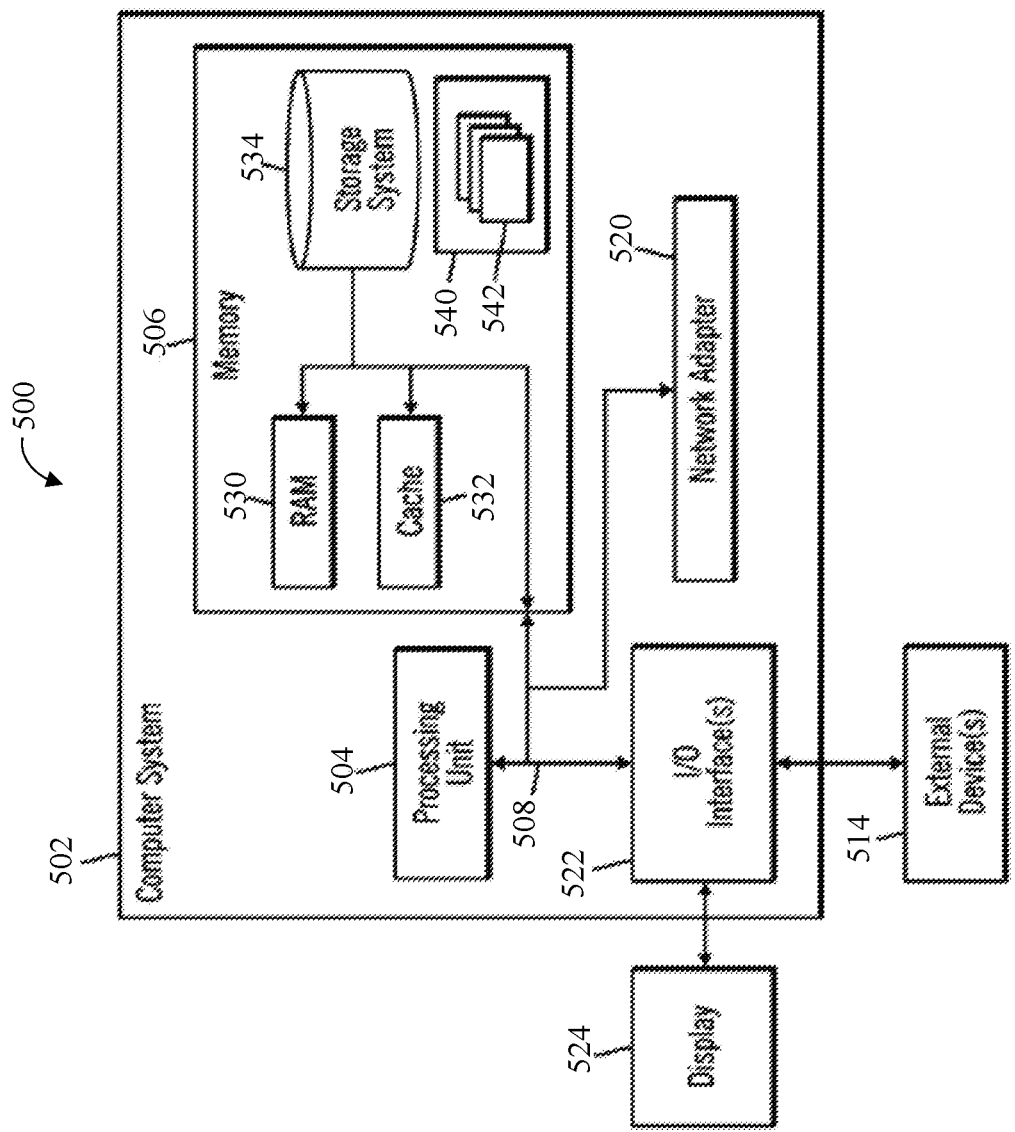
FIG. 5 is a block diagram illustrating a computer system/server of a cloud-based support system, to implement the processes described above with respect to FIGS. 1-4, in accordance with some embodiments of the present disclosure.

Aspects of the computer system 100 may be embodied in a computer system/server in a single location, or in at least one embodiment, may be configured in a cloud-based system sharing computing resources. With reference to FIG. 5, a block diagram is provided illustrating an example of a computer system 500 including a computer/server 502, hereinafter referred to as a host 502 in communication with a cloud based support system, to implement the system, tools, and processes described above with respect to FIGS. 1-4. Host 502 is operational with numerous other general purpose or special purpose computer system environments or configurations. Examples of well-known computer systems, environments, and/or configurations that may be suitable for use with host 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 502 may be described in the general context of computer system-executable instructions, such as program modules, being executed by a computer system. Generally, program modules may include routines, programs, objects, components, logic, data structures, and so on that perform particular tasks or implement particular abstract data types. Host 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, host 502 is shown in the form of a general-purpose computing device. The components of host 502 may include, but are not limited to, one or more processors or processing devices or units 504, e.g. hardware processors, a system memory 506, and a bus 508 that couples various system components including system memory 506 to processing device 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 502 typically includes a variety of computer system readable media. Such media may be any available media that is accessible by host 502 and it includes both volatile and non-volatile media, removable and non-removable media.

Memory 506 can include computer system readable media in the form of volatile memory, such as random access memory (RAM) 530 and/or cache memory 532. By way of example only, a storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces.

Program/utility 540, having a set (at least one) of program modules 542, may be stored in memory 506 by way of example, and not limitation, as well as an operating system, one or more application programs, other program modules, and program data. Each of the operating systems, one or more application programs, other program modules, and program data or some combination thereof, may include an implementation of a networking environment. Program modules 542 generally carry out the functions and/or methodologies of embodiments as described in FIGS. 1-4.

Host 502 may also communicate with one or more external devices 514, such as a keyboard, a pointing device, etc.; a display 524; one or more devices that enable a user to interact with host 502; and/or any devices (e.g., network card, modem, etc.) that enable host 502 to communicate with one or more other computing devices. Such communication can occur via Input/Output (I/O) interface(s) 522. Still yet, host 502 can communicate with one or more networks such as a local area network (LAN), a general wide area network (WAN), and/or a public network (e.g., the Internet) via network adapter 520. As depicted, network adapter 520 communicates with the other components of host 502 via bus 508. In at least one embodiment, a plurality of nodes of a distributed file system (not shown) is in communication with the host 502 via the I/O interface 522 or via the network adapter 520. It should be understood that although not shown, other hardware and/or software components could be used in conjunction with host 502. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 506, including RAM 530, cache memory 532, and storage system 534, such as a removable storage drive and a hard disk installed in a hard disk drive.

Computer programs (also called computer control logic) are stored in memory 506. Computer programs may also be received via a communication interface, such as network adapter 520. Such computer programs, when run, enable the computer system to perform the features of the present embodiments as discussed herein. In particular, the computer programs, when run, enable the processing device 504 to perform the features of the computer system 500. As such, computer programs may represent controllers of the computer system 500.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 502 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
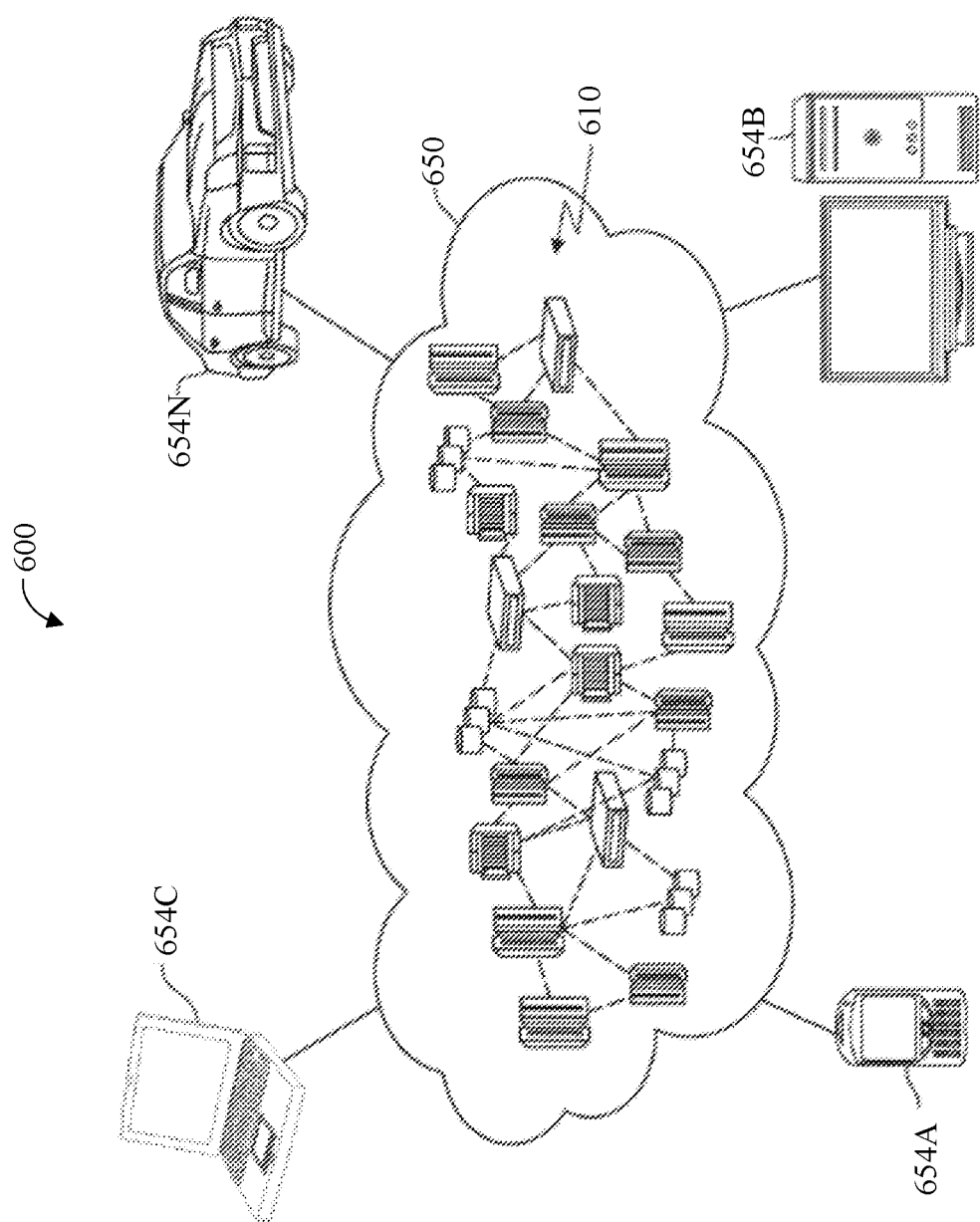
FIG. 6 is a schematic diagram illustrating a cloud computer environment, in accordance with some embodiments of the present disclosure.

Referring now to FIG. 6, a schematic diagram is provided illustrating an example cloud computing network 600. As shown, cloud computing network 600 includes a cloud computing environment 650 having one or more cloud computing nodes 610 with which local computing devices used by cloud consumers may communicate. Examples of these local computing devices include, but are not limited to, personal digital assistant (PDA) or cellular telephone 654A, desktop computer 654B, laptop computer 654C, and/or automobile computer system 654N. Individual nodes within nodes 610 may further communicate with one another. They may be grouped (not shown) physically or virtually, in one or more networks, such as Private, Community, Public, or Hybrid clouds as described hereinabove, or a combination thereof. This allows the cloud computing network 600 to offer infrastructure, platforms and/or software as services for which a cloud consumer does not need to maintain resources on a local computing device. It is understood that the types of computing devices 654A-N shown in FIG. 6 are intended to be illustrative only and that the cloud computing environment 650 can communicate with any type of computerized device over any type of network and/or network addressable connection (e.g., using a web browser).

Figure 7:
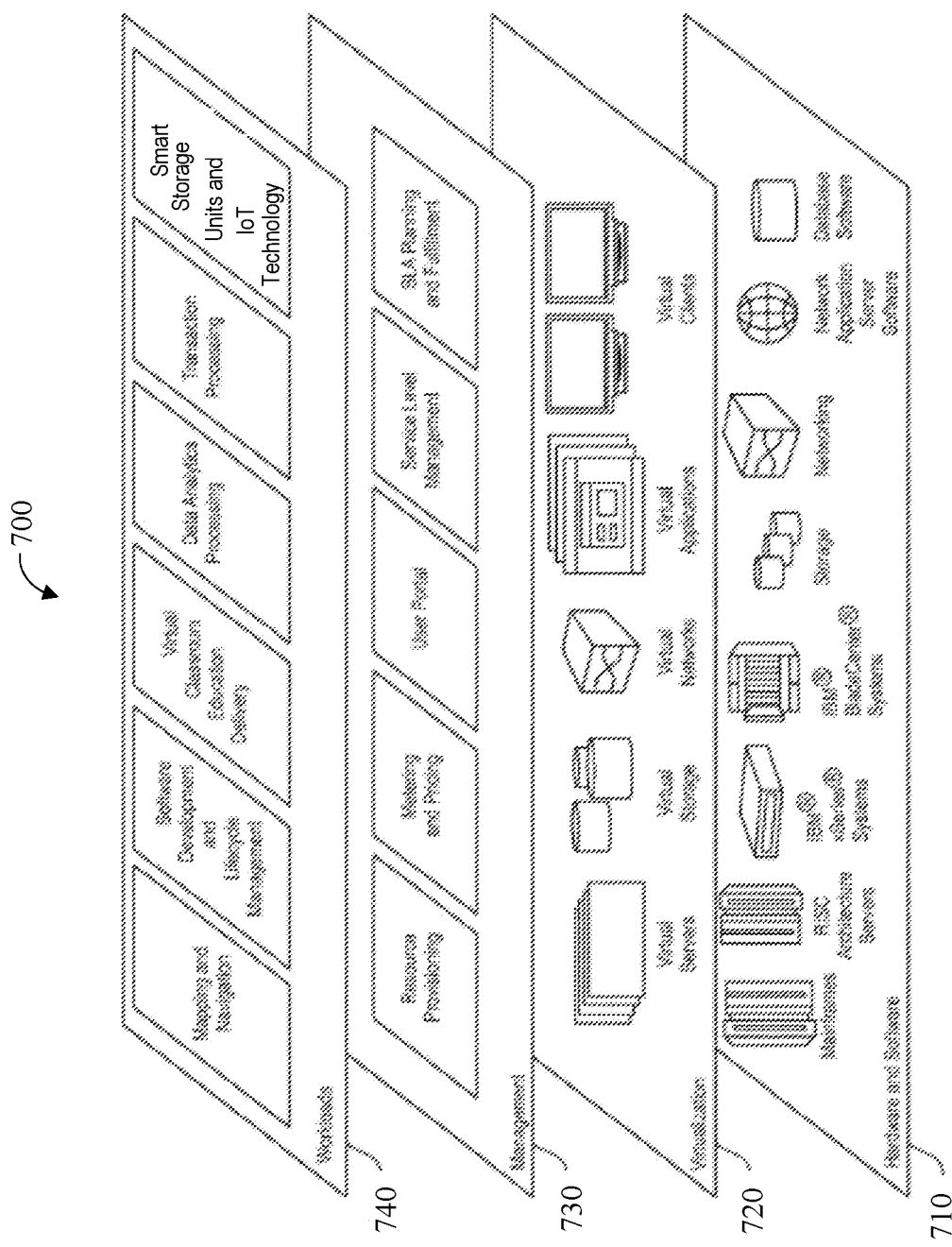
FIG. 7 is a block diagram illustrating a set of functional abstraction model layers provided by the cloud computing environment, in accordance with some embodiments of the present disclosure.

Referring now to FIG. 7, a set of functional abstraction layers 700 provided by the cloud computing network of FIG. 7 is shown. It should be understood in advance that the components, layers, and functions shown in FIG. 7 are intended to be illustrative only, and the embodiments are not limited thereto. As depicted, the following layers and corresponding functions are provided: hardware and software layer 710, virtualization layer 720, management layer 730, and workload layer 740.

The hardware and software layer 710 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 720 provides an abstraction layer from which the following examples of virtual entities may be provided: virtual servers; virtual storage; virtual networks, including virtual private networks; virtual applications and operating systems; and virtual clients.

In one example, management layer 730 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 740 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and smart storage units using Internet of things (IoT) technology, and, more specifically, for substantially end-to-end autonomous management of consumable commodities.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
    a robot comprising:
        one or more external lighting devices; and
    a storage unit comprising a cap and a container portion, the cap coupled to the container portion, the cap communicatively coupled to the robot, the cap comprising:
        one or more external energy collection devices configured to receive light energy from the one or more external lighting devices; and
        a first processing device electrically coupled to the one or more external energy collection devices, the first processing device configured to:
            collect data associated with an inventory of contents of the container portion; and
            transmit the inventory data to the robot.

2. The system of claim 1, wherein:
    the container portion is configured to define a storage cavity therein, the storage cavity configured to receive the contents therein, the container portion comprising:
        one or more level measurement scales positioned within the storage cavity; and
    the cap further comprising:
        one or more internal lighting devices configured to illuminate at least a portion of the one or more measurement scales; and
        one or more imaging devices configured to capture an image of the one or more measurement scales.

3. The system of claim 2, wherein the first processing device is further configured to:
    energize the one or more internal lighting devices;
    capture one or more images of the one or more measurement scales when illuminated by the one or more internal lighting devices; and
    transmit the one or more images of the one or more measurement scales to the robot.

4. The system of claim 3, wherein the robot further comprises:
    a second processing device configured to:
        receive the one or more images of the one or more measurement scales from the cap; and
        analyze the one or more images of the one or more measurement scales.

5. The system of claim 4, further comprising a network computing device communicatively coupled to the robot, the network computing device comprising:
    a third processing device configured to:
        determine the storage cavity requires filling with additional content therein; and
        subject to the determination, transmit a commercial order for additional material to a material supplier.

6. The system of claim 4, wherein the robot further comprises:
    one or more motive transport devices operably coupled to the second processing device; and
    one or more object handling devices operably coupled to the second processing device, the second processing device further configured to:
        direct the one or more motive transport devices to transport the robot to a proximate location of the cap;
        direct the one or more object handling devices to uncouple the cap from the container portion; and
        direct the one or more handling devices and the one or more motive transport devices to transport the container portion to a predetermined location for transport to the material supplier.

7. The system of claim 6, wherein the second processing device is further configured to:
    direct, subject to a notification of a return of the container portion to the predetermined location, the robot to transit to the predetermined location through the one or more motive transport devices;
    transport, through the one or more object handling devices, the container portion to the proximate location of the cap; and
    direct the one or more object handling devices to couple the cap to the container portion.

8. The system of claim 2, wherein:
    the one or more internal lighting devices are further configured to illuminate at least a portion of the material.

9. The system of claim 1, wherein:
    the container portion is substantially opaque to external light.

10. A computer program product for managing material levels within one or more storage units, the computer program product comprising:
    one or more computer readable storage media; and
    program instructions collectively stored on the one or more computer-readable storage media, the program instructions comprising:
        program instructions to boot up a first processing device in response to the first processing device being energized with at least a portion of light energy captured by one or more external energy collection devices coupled to a cap for a storage unit, the one or more external energy collection devices being illuminated with light energy radiating from one or more external lighting devices coupled to a robot;
        program instructions to capture inventory data of contents within a container portion of the storage unit; and
        program instructions to transmit, with at least a portion of the light energy, the captured inventory data to the robot.

11. The computer program product of claim 10, further comprising:
    program instructions to energize, with at least a portion of the light energy, one or more internal lighting devices positioned within the cap;
    program instructions to illuminate, through the one or more internal lighting devices, with at least a portion of the light energy, one or more measurement scales positioned within a storage cavity defined by the container portion with at least a portion of the light energy;
    program instructions to capture, through one or more imaging devices positioned within the cap, with at least a portion of the light energy, one or more images of the one or more measurement scales; and
    program instructions to transmit, with at least a portion of the light energy, the one or more images of the one or more measurement scales to the robot.

12. A computer program product of claim 11, further comprising:
program instructions to receive, by the robot, the one or more images of the one or more measurement scales from the cap; and
program instructions to analyze, by the robot, the one or more images of the one or more measurement scales.

13. The computer program product of claim 12, further comprising:
program instructions to determine, by a network computing device, subject to the analysis, the storage cavity requires filling with material therein; and
program instructions to transmit, from the network computing device, subject to the determination, a commercial order for the material to a material supplier.

14. The computer program product of claim 13, further comprising:
program instructions to transport the robot, through one or more motive transport devices of the robot, to a proximate location of the cap;
program instructions to uncouple, through one or more object handling devices of the robot, the cap from the container portion;
program instructions to transport the container portion, through the one or more handling devices and the one or more motive transport devices, to a predetermined location for transport to the material supplier;
program instructions to transport the robot, subject to a notification of a return of the container portion to the predetermined location, through the one or more motive transport devices, to the predetermined location;
program instructions to transport, through the one or more object handling devices, the container portion to the proximate location of the cap; and
program instructions to couple, through the one or more object handling devices, the cap to the container portion.

15. A computer-implemented method comprising:
capturing, by one or more external energy collection devices coupled to a cap for a storage unit, at least a portion of light energy radiating from one or more external lighting devices coupled to a robot, the one or more external energy collection devices being illuminated by the light energy;
energizing, with at least a portion of the light energy, a first processing device within the cap with at least a portion of the light energy;
booting up the first processing device;
capturing inventory data of contents within a container portion of the storage unit; and
transmitting, with at least a portion of the light energy, the captured inventory data to the robot.

16. The method of claim 15, further comprising:
energizing, with at least a portion of the light energy, one or more internal lighting devices positioned within the cap;
illuminating, through the one or more internal lighting devices, with at least a portion of the light energy, one or more measurement scales positioned within a storage cavity defined by the container portion with at least a portion of the light energy;
capturing, through one or more imaging devices positioned within the cap, with at least a portion of the light energy, one or more images of the one or more measurement scales; and
transmitting, with at least a portion of the light energy, the one or more images of the one or more measurement scales to the robot.

17. A method of claim 16, further comprising:
receiving, by the robot, the one or more images of the one or more measurement scales from the cap; and
analyzing, by the robot, the one or more images of the one or more measurement scales.

18. The method of claim 17, further comprising:
determining, by a network computing device, subject to the analysis, the storage cavity requires filling with material therein; and
transmitting, from the network computing device, subject to the determination, a commercial order for the material to a material supplier.

19. The method of claim 18, further comprising:
transporting the robot, through one or more motive transport devices of the robot, to a proximate location of the cap;
uncoupling, through one or more object handling devices of the robot, the cap from the container portion; and
transporting the container portion, through the one or more handling devices and the one or more motive transport devices, to a predetermined location for transport to the material supplier.

20. The method of claim 19, further comprising:
transporting the robot, subject to a notification of a return of the container portion to the predetermined location, through the one or more motive transport devices, to the predetermined location;
transporting, through the one or more handling devices, the container portion to the proximate location of the cap; and
coupling, through the one or more object handling devices, the cap to the container portion.

* * * * *